United States Patent [19]

Segawa

[11] Patent Number: 5,697,391
[45] Date of Patent: Dec. 16, 1997

[54] METHOD FOR MAKING A COLOR FILTER

[75] Inventor: Yuji Segawa, Kanagawa, Japan

[73] Assignee: Sony Corporation, Tokyo, Japan

[21] Appl. No.: 803,576

[22] Filed: Feb. 21, 1997

Related U.S. Application Data

[60] Continuation of Ser. No. 438,833, May 11, 1995, which is a division of Ser. No. 290,101, Aug. 15, 1994, abandoned.

[30] Foreign Application Priority Data

Aug. 18, 1993 [JP] Japan ............... P05-204259

[51] Int. Cl.⁶ ........................................... B08B 3/04
[52] U.S. Cl. .................. 134/102.2; 134/147; 134/902
[58] Field of Search .................. 134/186, 102.2, 134/902, 147, 184, 164

[56] References Cited

U.S. PATENT DOCUMENTS

| | | | |
|---|---|---|---|
| 1,615,844 | 2/1927 | Knapp | 134/164 |
| 3,095,000 | 6/1963 | Hirst | 134/164 |
| 3,461,008 | 8/1969 | Laurie, Jr. | 134/164 |
| 4,302,273 | 11/1981 | Howard, Jr. | 134/902 |
| 4,305,413 | 12/1981 | Dougherty | 134/107 |
| 4,753,258 | 6/1988 | Seiichiro | 134/198 |
| 4,967,777 | 11/1990 | Takayama et al. | 134/102.2 |
| 5,000,795 | 3/1991 | Chung et al. | 134/102.2 |
| 5,014,727 | 5/1991 | Aigo | 134/102.2 |
| 5,127,424 | 7/1992 | Stein et al. | 134/147 |
| 5,218,980 | 6/1993 | Evans | 134/184 |
| 5,226,969 | 7/1993 | Watanabe et al. | 134/184 |

FOREIGN PATENT DOCUMENTS

| | | | |
|---|---|---|---|
| 3-255629 | 11/1991 | Japan | 134/902 |
| 4-7831 | 1/1992 | Japan | 134/902 |

*Primary Examiner*—Frankie L. Stinson
*Attorney, Agent, or Firm*—Hill, Steadman & Simpson

[57] ABSTRACT

Method and apparatus for making a color filer are described in which substrates are subjected to uniform wet treatment without damaging the substrates. A liquid developer 3 is placed in a developing vessel 2 provided with a bubbler 4 at the bottom of the vessel 2. A plurality of glass substrates are vertically immersed in the developer 3 and bubbles 7 are generated by feeding $N_2$ gas to the bubbler 4. The glass substrates 6 are developed while circulating the developer 3 by the bubbling.

13 Claims, 4 Drawing Sheets

METHOD FOR MAKING A COLOR FILTER

This is a continuation of application Ser. No. 08/438,833 filed May 11, 1995, which is a division of application Ser. No. 08/290,101, filed Aug. 15, 1994 abandoned.

BACKGROUND OF THE INVENTION

This invention relates to a method for making a color filter which is adapted for use in color liquid crystal display devices, for example.

A typical, known method for making a color filter for use in liquid crystal panels is a pigment dispersion method. In this method, a solvent dispersing pigments therein is coated onto a glass substrate and the resulting coating is patterned by use of lithographic techniques including exposing and developing steps to form colored pixels.

The pigment dispersion method can be broadly classified into two categories including a pigment dispersion resist method wherein a dispersion medium for pigment consists of photosensitive resins and an etching method wherein photosensitive resins are used as a dispersion medium and are combined with a resist during the course of a fabrication process.

The pigment dispersion resist methods which have now been put into practice are of a water-soluble resist type wherein a PVA (polyvinyl alcohol)/stilbazole mixture is used as a photosensitive resin and of a type wherein an acrylic resin is used for the photosensitive resin.

In the pigment dispersion resist method, pixels are formed by a process which comprises coating a resist dispersing a pigment onto a glass substrate and repeating a patterning step utilizing a photolithographic technique of light exposure and development to form pixels of three colors R (red), G (green) and B (blue) or four colors adding a light absorption film (black matrix) to the three colors.

On the other hand, the etching method makes use of a resin system based on a polyamic acid, which is a precursor of polyimide, as a non-photosensitive resin. The fabrication process comprises coating a resin dispersing a pigment onto a glass substrate, and repeating the steps of coating a positive resist on the resin coating, pattering the resist by photolithography and etching the resin coating, thereby forming three color pixels. In this method, both the development of the positive resist and the etching of the pigment-dispersed resin layer are frequently conducted by only one developing procedure.

In either of the above-stated methods, a wet process such as the development or etching is essential.

In FIG. 3, there is show a flow chart of a developing method wherein substrates are treated according to a currently employed, most popular uniform continuous conveying system.

In this method, substrates are usually horizontally conveyed one by one toward a treating vessel wherein the entire areas of the substrate are treated, followed by further conveyance to another treating vessel for a subsequent treating step.

As shown in FIG. 3, a substrate 20 made, for example, of glass is fed from a loader 21 to a rinsing unit 22 wherein the substrate 20 is simply washed by shaking and by means of a rinsing spray.

Then, the substrate 20 is fed to a developing unit 23 and developed by use of a device shown, for example, in FIG. 4.

In the developing device 24 shown in FIG. 4, the substrate 20 is immersed in a liquid developer filled in a developing vessel 25 and is sprayed with a liquid developer 26. In order to permit uniform development, the substrate 20 is shaken.

The substrate 20 is then fed to a rinsing unit 27 wherein the substrate 20 is again rinsed by shaking and spraying. In this step, rinsing may be effected by D-sonic rinsing (i.e. rinsing with water by a supersonic wave in the order of MHz) or by disk brushing.

Further, the substrate is dried by application of hot air in an air knife unit 28. By this, pixels for one color are completed. Thereafter, the substrate 20 is fed to an unloader 29.

However, when the pigment-dispersed resist or resin is developed and etched by the above procedure, the following problems are liable to be produced.

1. Uneven development is liable to occur owing to the spraying.

2. In the pigment dispersion method wherein undesirable films are apt to remain, a tough film may be left when a spraying pressure is increased or a pattern formed may be damaged, causing the developing performance to be worsened.

3. Where a development by dipping alone is adopted, the substrate 20 shown in FIG. 4 is conveyed horizontally, so that the liquid developer 26 is not circulated smoothly, resulting in the pigment being left on the substrate 20 to provide a residual film or an uneven surface.

4. Where a spraying system is used in the rinsing step, unevenness is liable to occur. On the other hand, use of supersonic wave or a brush tends to damage a color filter portion being formed.

SUMMARY OF THE INVENTION

It is accordingly an object of the invention to provide method and apparatus for making a color filter which is adapted for use in liquid crystal display devices and which overcomes the problems involved in prior art.

It is another object of the invention to provide method and apparatus for making a color filter wherein a substrate is substantially free of any damage during the course of treating steps and uniform wet treatments are possible.

According to one embodiment of the invention, there is provided a method for making a color filter which comprises subjecting a substrate to wet treatment with a treating liquid which is circulated while bubbling. More particularly, as shown in FIG. 1, for example, a substrate 6 is wet treated with a treating liquid 3 which is being bubbled.

According to another embodiment of the invention, there is also provided a processing apparatus which comprises:

a treating vessel having a treating liquid therein;

means for holding a plurality of substrates vertically within the treating liquid; and a bubble generator capable of generating bubbles in the treating liquid.

The apparatus is used for making a component of electronic display device, such as color filter.

More particularly, as shown in FIG. 1, this apparatus includes a bubble generating means 4 for generating bubbles in a treating liquid 3 filled in a treating vessel 2. The treating liquid 3 may be a liquid developer.

In the practice of the invention, the treating liquid 3 is bubbled, so that the resultant bubbles 7 appropriately agitate the treating liquid 3 on the surfaces of the substrate 6 to allow the liquid on the substrate surfaces to be replaced by a fresh one. Little influence of the bubbles 7 on the substrate 6 is observed. For instance, when the substrate 6 is formed with a filter portion of a given color, the filter portion is substantially free of any physical damage.

The treating liquid can be readily bubbled as desired when using a treating apparatus which is provided with a bubble generating means 4 capable of generating bubbles 7 in the treating liquid 3 filled in the vessel 2.

According to the invention, when a liquid developer is used as the treating liquid 3, development can be effected efficiently without damaging filter portions.

PREFERRED EMBODIMENTS OF THE INVENTION

Figure 1:
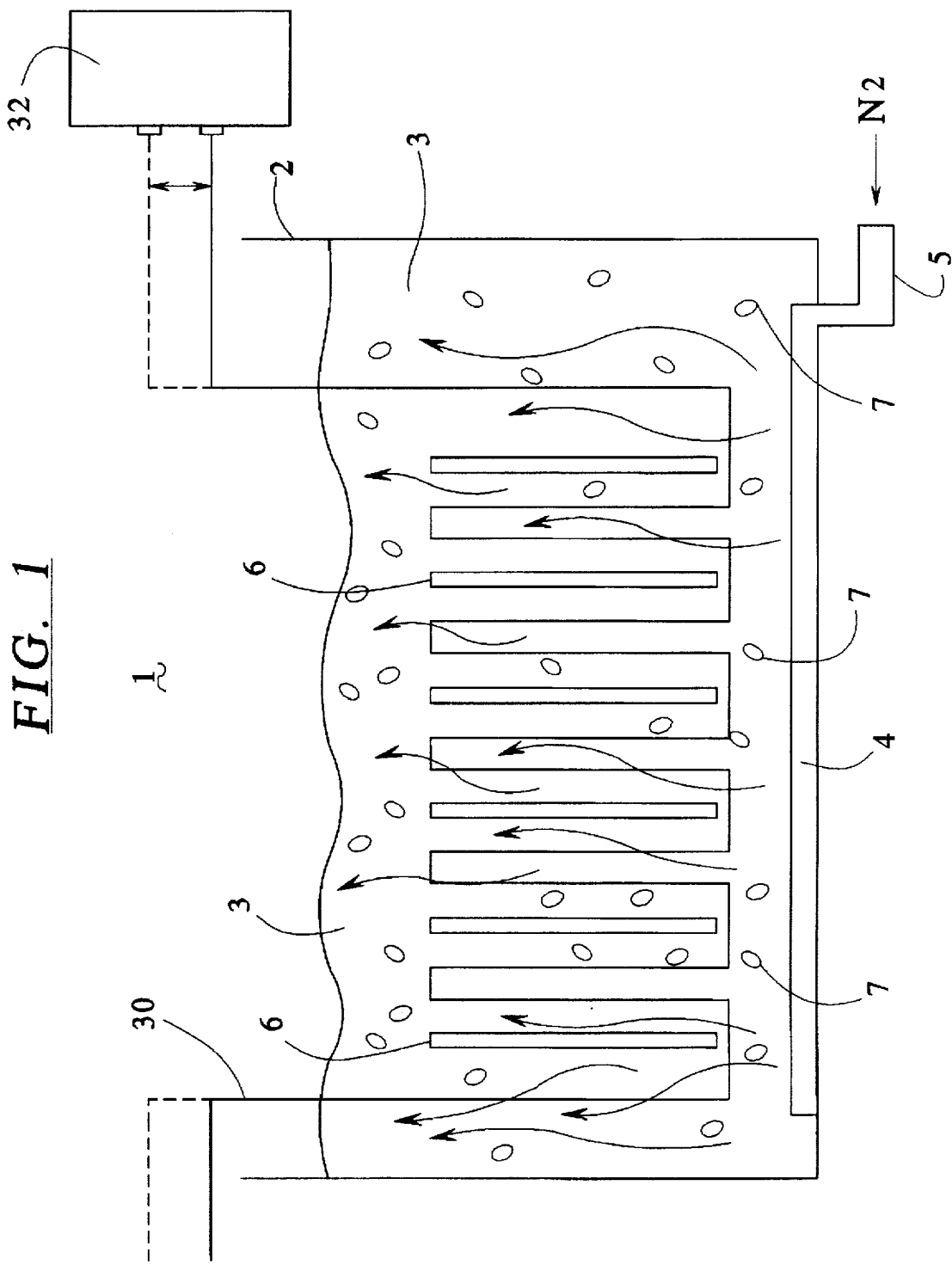
FIG. 1 is a schematic view showing a developing apparatus according to an embodiment of the invention.
Figure 2:
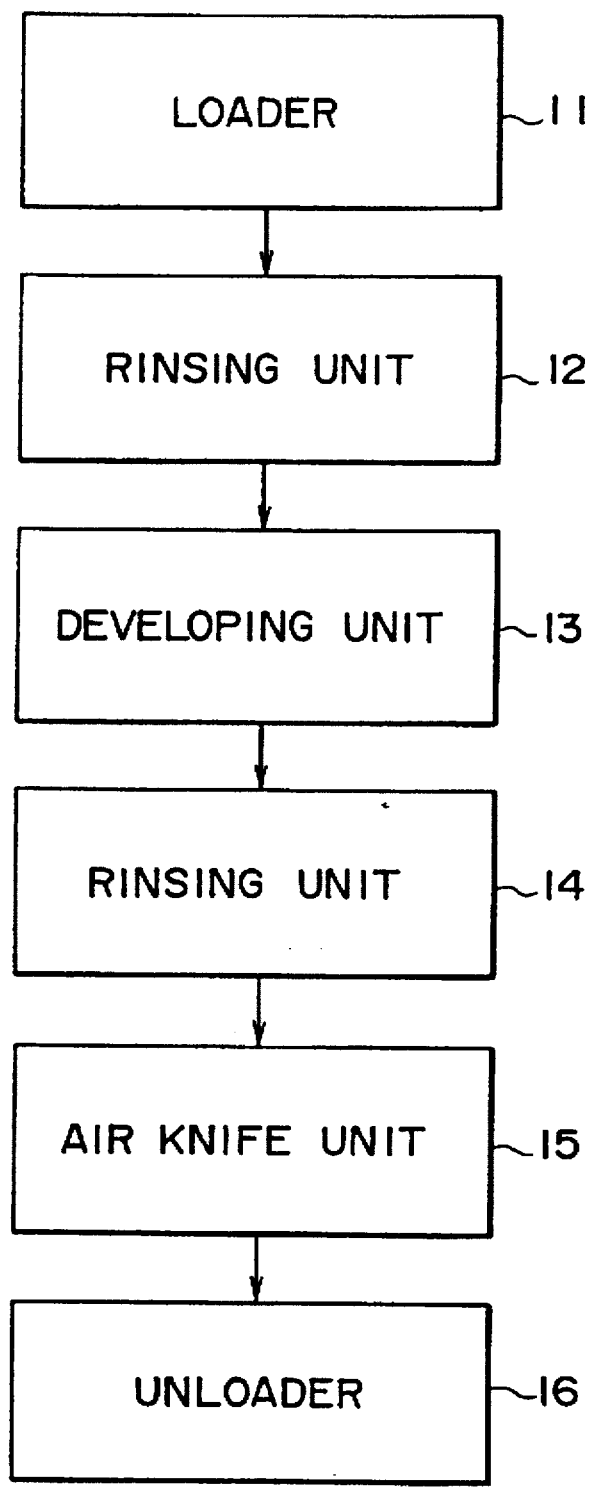
FIG. 2 is a flow chart showing a developing process used in the embodiment.
Figure 3:
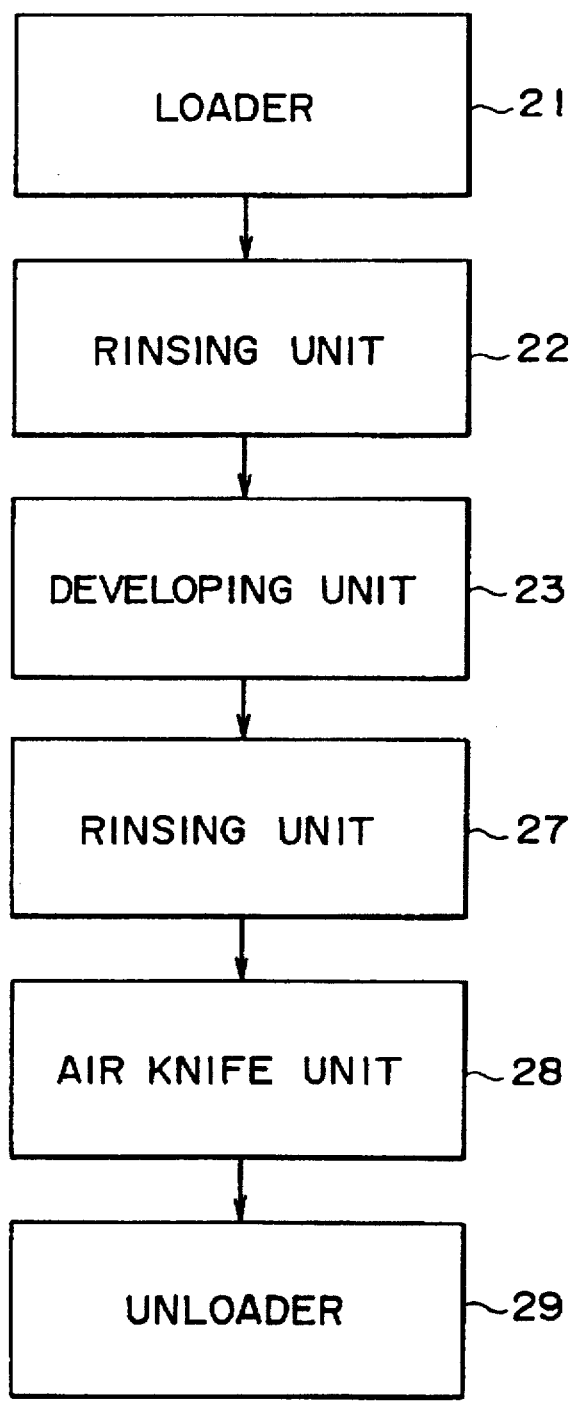
FIG. 3 is a flow chart showing a developing process used in prior art.

Reference is now made to the accompanying drawings and particularly, to FIGS. 1 and 2.

FIG. 2 shows a flow chart of a developing process for treating substrates according to the most popular, uniform and continuous conveying system.

As shown in the figure, the system includes a loader 11, a rinsing unit 12, a developing unit 13, a rinsing unit 14, an air knife unit 15 and an unloader 16.

As shown in FIG. 2, a substrate from the loader 11 is fed to the rinsing unit 12 wherein it is simply rinsed by shaking and water spraying.

Then, the substrate is fed to the developing unit 13 wherein it is developed by means of a device described hereinafter.

Further, the substrate is fed to the air knife unit 15 and dried by means of hot air thereby completing pixels for a given color. Subsequently, the substrate is fed to the unloader 16.

The reason why a residual film is left on the substrate at the time of the development is considered mainly due to the poor circulation of a liquid developer. Although good results are obtained if a fresh liquid developer (e.g. a 1% alkaline solution such as of $Na_2CO_3$) is invariably supplied, it may be inevitable that the liquid developer be degraded such as by incorporation of pigment or exposure to an atmosphere of oxygen during the course of the development. Accordingly, it is important that the developer for treating the substrate be always circulated.

Figure 4:
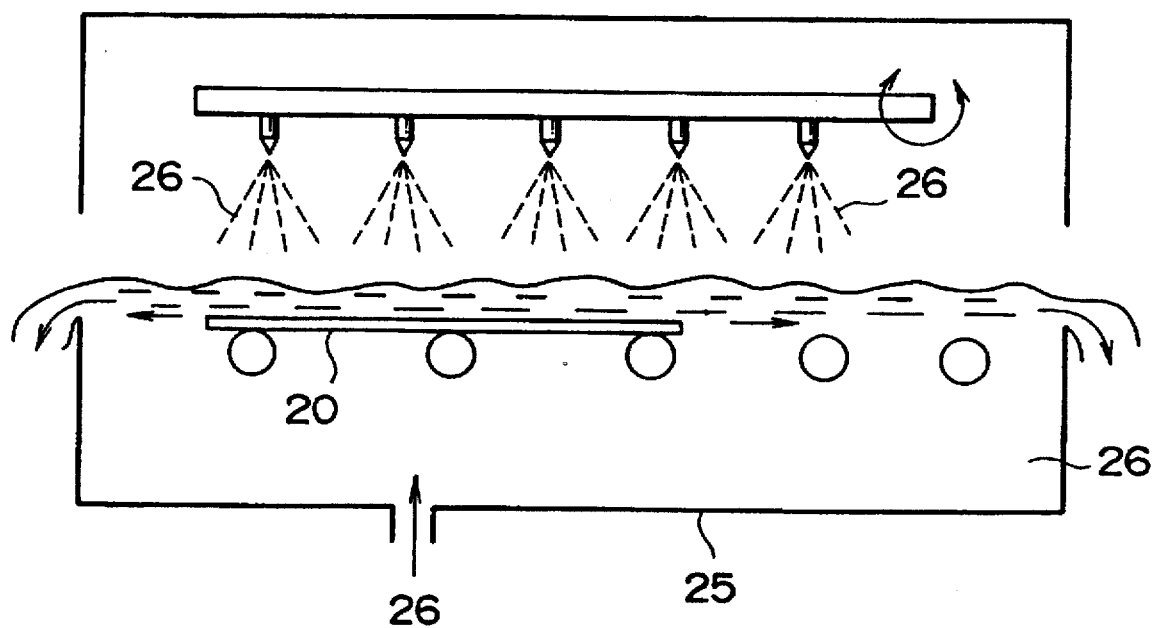
FIG. 4 is a schematic view of a known developing apparatus.

As having set out hereinabove, where a substrate is immersed in a liquid developer horizontally as shown in FIG. 4, the developer 26 is circulated as being overflown but the circulation of the developer on the substrate 20 may not be satisfactory. In the case, the developer 26 may be agitated to an extent by spraying a developer 26. Nevertheless, such spraying will bring about unevenness.

In the practice of the invention, such a problem of the prior art is solved by use of a developing apparatus of the type set out below.

FIG. 1 shows a total arrangement of a developing apparatus according to the invention.

As shown in the figure, a developing apparatus 1 has a developing vessel 2 filled with a liquid developer 3. A bubbler 4 capable of forming bubbles as having controlled size and density is provided at the bottom of the developing vessel 2. The bubbler 4 is supplied with a gas through a pipe 5 provided at the outside of the apparatus 1. It will be noted that although not shown in the figure, the liquid developer 3 is arranged as being circulated.

Moreover, as shown in FIG. 1, a plurality of glass substrates to be developed are immersed in the liquid developer 3 at one time while standing vertically. These glass substrates 6 are held such as with a basket 30. In this case, the respective glass substrates are applied with a pigment-dispersed resist such as Color Mosaic commercially available from Fuji Hunt Electronics Co., Ltd., followed by exposure to light through a mask of a given pattern.

The bubblers 4 may be, for example, in the form of a tube having through-holes at equal intervals or may be made of porous resins, so that bubbles 7 are uniformly jetted or blasted toward the liquid developer 3 over an entire region thereof. The tube or resin used should preferably be made of a resin which is resistant to alkali or acid and includes, for example, polypropylene or polytetrafluoroethylene. The gas used to produce the bubbles should preferably be an inert gas, such as $N_2$ gas, which does not degrade the developer.

The flow rate of $N_2$ may differ depending on the capacity of the developing vessel 2 and the size of the blasting pores for the bubbles 7. For instance, with a vessel having a pore size of 1.0 mm, a pore density of one pore per $cm^2$ and a capacity of 30 liters, the flow rate is in the range of from 5 to 10 ml/minute. A smaller diameter of the blasting pores for the bubbles 7 is preferred. More particularly, it is considered that a smaller size of the bubbles 7 is more suitable for uniform development.

In the apparatus of this embodiment having such an arrangement as set out hereinabove, the bubbles jetted from the bubbler 4 rise along the surfaces of the glass substrates 6 as is particularly shown in FIG. 1, by which the developer 3 on the surfaces of the respective glass substrates 6 are well agitated to invariably substitute a contacted one with a fresh developer. As shown in FIG. 1, the bubbles 7 are produced over the entire region of the developing vessel 2. Thus, all the developer 3 is circulated and agitated in an efficient manner.

Thus, according to the apparatus of the invention, it becomes possible to treat a plurality of the glass substrates 6, the number of which depends on the size of the vessel, at one time. If the apparatus is arranged so that the glass substrates are shaken vertically at the time of development, such as with vertical shaker 32 the circulation efficiency of the developer 3 is improved, ensuring the developing time being shortened.

According to the invention, the following features and advantages can be attained.

The development is effected under bubbling conditions, so that color filter portions are not physically damaged such as by beating a liquid developer against the glass substrate 6 by spraying or rubbing the glass substrate 6 by a scrub brush.

Any conveying system wherein the glass substrates are conveyed one by one is not used and mechanical troubles are unlikely to occur. The apparatus can be readily scaled up and is suitable for development of large-sized substrates.

Where a liquid developer is heated, the temperature of the developer can be maintained uniformly owing to the uniform agitation through bubbling.

In the above embodiment, the apparatus is so arranged that the bubbles are generated from the bottom of the developing vessel. The invention should not be construed as limiting the invention to this embodiment. Bubbles may be generated from the side portions of the developing vessel. In this case, it will be necessary to jet the developer and bubbles at the same time so that the bubbles are passed between adjacent substrates to a full extent. In addition, the substrates are arranged vertically in the embodiment and may be obliquely inclined or may be placed horizontally.

The method and apparatus of the invention may be applied not only for development, but also for rinsing and etching.

As stated hereinbefore, in the practice of the invention, there is used a treating apparatus which is provided with a bubble generating means capable of generating bubbles in a liquid developer within a treating vessel. The treating liquid is bubbled for wet treatment, under which the treating liquid can be uniformly circulated or agitated without damaging substrates, ensuring uniform treatment. Especially, when a liquid developer is used for the treating liquid, good development is assured.

Moreover, according to the invention, a number of substrates can be treated at the same time. When a liquid developer is heated, its temperature can be uniformly maintained at a desired level.

What is claimed is:

1. A color filter developer apparatus comprising:

a treatment vessel for developing glass color filter substrates in a liquid developer solution, the treatment vessel having a bottom end filled with a liquid developer solution;

a basket member adapted to receive and hold a plurality of glass color filter substrates in a vertical orientation, said basket member being positionable in the treatment vessel so that the glass color filter substrates disposed therein are immersed in the liquid developer solution;

a bubble generator disposed in the treatment vessel adjacent the bottom end including a porous tube into which a flow of an inert gas may be introduced to generate bubbles of inert gas in the developer solution; and means for shaking the glass substrates vertically within the treatment vessel and developer solution.

2. An apparatus as defined in claim 1, wherein in said bubble generator the porous tube has through-holes at equal intervals.

3. An apparatus as defined in claim 1, wherein in said bubble generator, the porous tube is comprised of a porous resin.

4. An apparatus as defined in claim 1, wherein said shaker means comprises a vertical shaker connected to the basket member which is effective to vertically shake the basket member and glass substrates in the developer solution.

5. An apparatus as defined in claim 4, wherein said porous tube is fabricated from a material selected from the group consisting of polypropylene and polytetrafluoroethylene.

6. An apparatus as defined in claim 5 wherein the inert gas is nitrogen.

7. An apparatus as defined in claim 1 wherein the liquid developer solution comprises an alkaline solution comprising 1% $Na_2CO_3$.

8. An apparatus for developing glass substrates for use as glass color filters, the apparatus comprising:

a developer tank having a bottom and an open top and filled with a liquid developer solution for developing a plurality of glass substrates, the treatment vessel accommodating a basket member, the basket member adapted to receive and hold the plurality of glass substrates in a substantially vertical orientation, the basket member being supported in the developer tank so that the glass substrates held by the basket member are immersed in the liquid developer solution, a bubble generator disposed in the developer tank adjacent to the bottom of the tank and below the glass substrates, the bubble generator comprising a porous tube for introducing a flow of an inert gas into the developer solution to generate bubbles of inert gas that travel upward through the developer solution, means for shaking the basket member and the glass substrates vertically within the developer tank and within the developer solution.

9. An apparatus as defined in claim 8 wherein said porous tube comprises a plurality of through-holes disposed at equal intervals along said tube.

10. An apparatus as defined in claim 8 wherein said porous tube comprises a porous resin.

11. An apparatus as defined in claim 8 wherein said porous tube is fabricated from a material selected from the group consisting of polypropylene and polytetrafluoroethylene.

12. An apparatus as defined in claim 8 wherein said inert gas is nitrogen.

13. An apparatus as defined in claim 8 wherein the liquid developer solution comprises an alkaline solution comprising 1% $Na_2Co_3$.

* * * * *